Aug. 31, 1937.  J. PHILLIPS  2,091,451
CONVERTIBLE INTERNAL COMBUSTION ENGINE AND COMPRESSOR
Filed June 13, 1934   4 Sheets-Sheet 1

INVENTOR.
John Phillips
BY
ATTORNEY.

Aug. 31, 1937.  J. PHILLIPS  2,091,451
CONVERTIBLE INTERNAL COMBUSTION ENGINE AND COMPRESSOR
Filed June 13, 1934  4 Sheets-Sheet 4
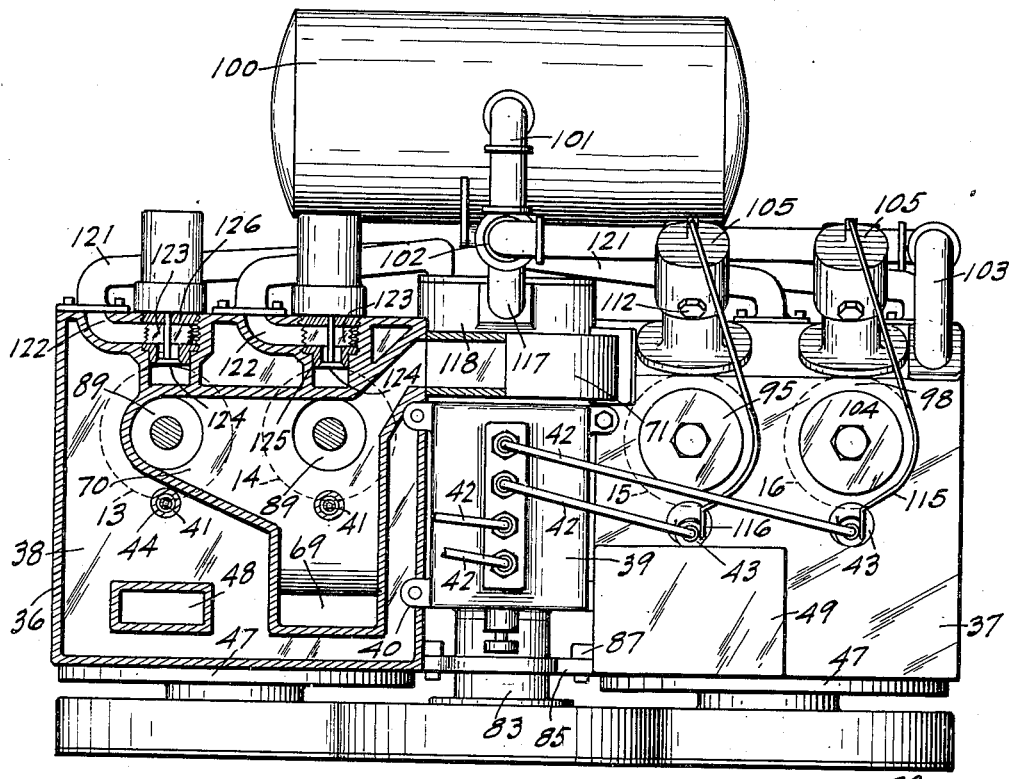

Patented Aug. 31, 1937

2,091,451

UNITED STATES PATENT OFFICE 2,091,451

CONVERTIBLE INTERNAL COMBUSTION ENGINE AND COMPRESSOR

John Phillips, Oakland, Calif.

Application June 13, 1934, Serial No. 730,420

12 Claims. (Cl. 123—21)

This invention is a convertible two-cycle internal combustion engine and compressor, and is particularly directed to a two-cycle engine of the "Diesel" type, in which fuel is injected into a highly compressed charge of air forming a spontaneously ignited explosive mixture, although the same principle may be applied to other means of ignition.

The outstanding feature of this invention is the introduction of air under pressure into the cylinder at all times when the pressure in the cylinder is below that of the air under pressure, whereby complete scavenging of the cylinders is accomplished at the terminus of the power stroke, followed by building up the pressure during the compression stroke until the pressure in the cylinder is equal to that of the air under pressure, the pressure in the cylinder thus being built up by an extraneous source coincidently with the building up of the pressure by compression through the agency of the piston, after which the further building up of the pressure in the cylinder is accomplished solely through the agency of the piston, providing a highly compressed charge without resort to a limited compression space of combustion chamber, and for this reason it is possible to obtain a more efficient and desirable atomization of the fuel upon injection and avoid the possibility of condensation.

This same feature permits conversion of the engine into a compressor of high efficiency, and may be so controlled as to permit conversion of one or more cylinders into compressor units while maintaining the balance of the cylinders as power units to drive the compressor units. When operating as a compressor or combined compressor and power unit, a very effective brake is provided thereby, whereby, when a vehicle is coasting down hill, conversion of one or more of the cylinders into compressor units acts to brake the vehicle.

In addition to this, conversion to a compressor of one cylinder after the engine is started, replenishes the supply of compressed air for starting the engine.

The objects of the invention are as follows:

First; To provide a two-cycle internal combustion engine with a supply of air under pressure for scavenging the cylinders and for building up the pressure in the cylinders during the compression stroke until the pressure in the cylinder is equal to the pressure of the supply of air, and to maintain constant the pressure of the supply irrespective of the speed of the engine.

Second; To provide an engine of the class described which operates on the principle of introduction of a charge of fuel into a highly compressed charge of air, utilizing the heat of compression and of the walls of the combustion chamber for spontaneously igniting the admixture.

Third; To provide a unit as outlined with an air or gas compressor or pump having a capacity of free air equal to or greater than the displacement of one cylinder whereby a complete charge of air is introduced into each cylinder for scavenging and auxiliarily building up the pressure during the compression stroke, and to provide such compressor of a type which is effective in maintaining pressure and which is also provided with cooling means for absorbing the heat of compression.

Fourth; To provide a unit as outlined in which one or more cylinders can be converted at will into compressor units which cooperate with the compressors previously outlined to increase the efficiency, and which converted compressor units may be utilized for braking purposes and coincidently building up a supply of air under pressure for starting the engine.

Fifth; To provide the unit outlined with an admission valve in each cylinder which is normally unseated or cracked, to permit unresisted flow of air for scavenging and supercharging, and which valve is automatically and quickly closed by the pressure within the cylinder when it attains a pressure in excess of that of the introduced air or that attempting admission, and which also closes by the same means when starting air is introduced into the cylinder.

Sixth; To provide a unit of the class described with an air starting unit which is operated and timed by the engine, and which supplies the initial charge of air for admixture with the fuel, air for the continued operation of the motor being supplied by the pump previously outlined.

Seventh; To provide a unit of the class described with positive driven compressors, fuel pump and starting distributor, and to provide means for maintaining a supply of air under pressure for starting.

Eighth; To provide an excess supply of air under pressure for scavenging purposes and to control the pressure thereof at will for controlling the degree of scavenging and auxiliary building up of pressure during the compression stroke, and which is dependent upon the relative location of the exhaust ports as related to crank travel.

Other objects and advantages of the invention will become apparent as the following description is read on the drawings forming a part of this specification, and in which similar reference characters are used to designate similar parts throughout the several views of which;

Fig. 4 is a plan view shown half in section taken on line 4—4 of Fig. 1.

Fig. 5 is a detailed side elevation of the compressor drum or rotor.

Fig. 6 is a section taken on line 6—6 of Fig. 7.

Fig. 7 is a section taken on line 7—7 of Fig. 5.

Figure 1:
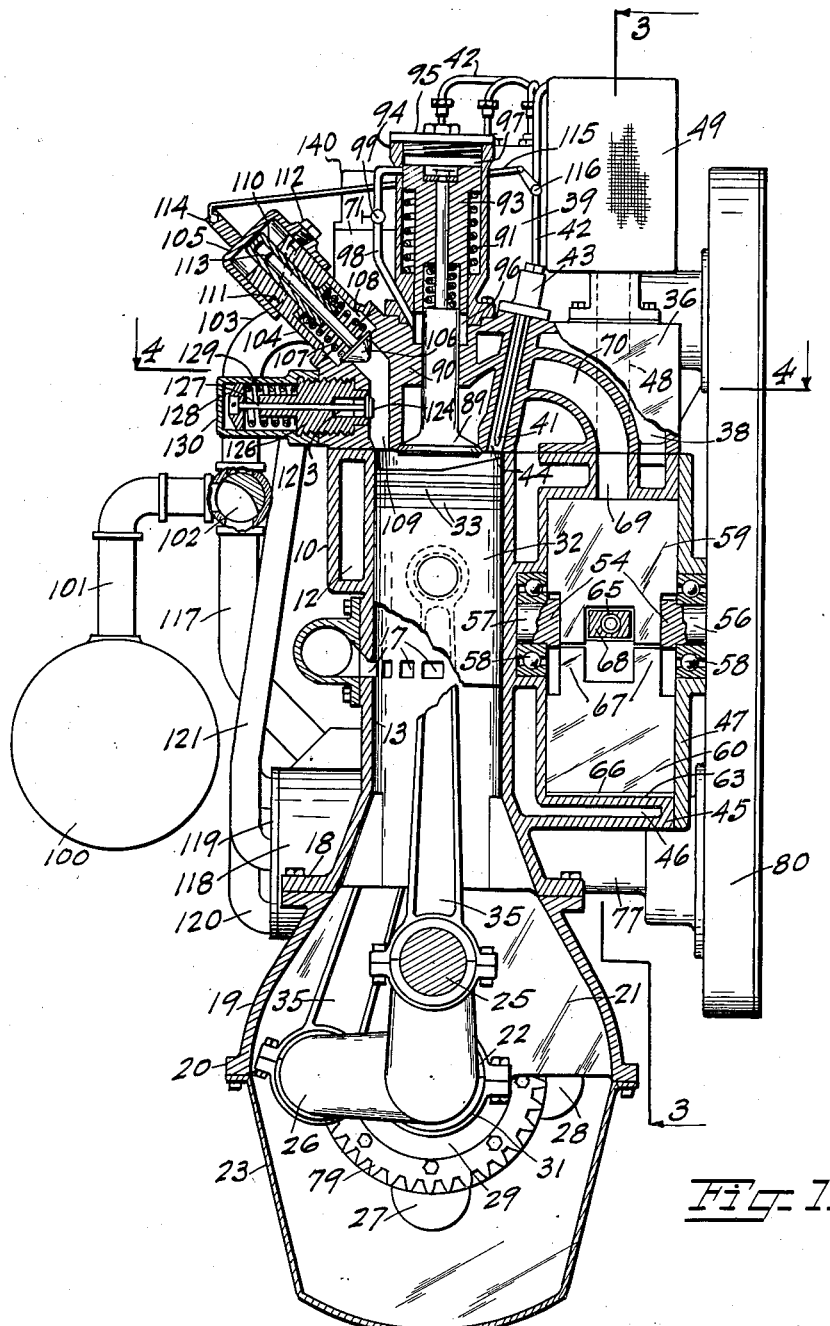
Fig. 1 is a sectional elevation through the invention taken partly through the transverse center of the first cylinder and partly through the center line of one of the compressors.

The invention consists of a two-cycle, convertible, internal combustion engine and compressor comprising one or more pairs of cylinders, each pair being formed in the individual blocks 10 and 11, each of which is provided with the usual water jackets 12, cylinders 13—14, and 15—16, and each of which cylinders is provided with a semi-circumferential series of exhaust ports 17 adjacent the lower terminus of travel of the piston, the lower end of each block terminating in a crank case supporting flange 18.

The upper crank case 19 is bolted to the flange 18 and terminates at its lower end in a lower crank case supporting flange 20 and has transverse bearing webs 21 with integral crank-shaft bearings 22.

The lower crank case 23 is bolted to the upper crank case and serves as an oil reservoir.

The crank shaft 24 has its cranks equi-angularly spaced and are angularly spaced 360° divided by the number of cranks. This motor being shown with four cylinders, the cranks 25, 26, 27, and 28 are angularly spaced 90°. A ring gear supporting flange 29 is formed intermediate the second and third cranks 26 and 27, and a flywheel 30 is mounted on one terminal end of the crank shaft and cooperates with a suitable clutch or other driving device (not shown). The crank shaft is supported by the bearing caps 31.

The pistons 32 are reciprocable in the cylinders and are provided with compression rings 33, and the heads of the pistons are formed with an inclined deflecting surface 34, downwardly inclined from the side opposite the ports 17 substantially to the transverse center of the piston, for the purpose of causing admitted air under pressure to sweep the exhaust gases to the exhaust ports 17 when the scavenging air is introduced. This provides thorough scavenging of the cylinders, and the exhaust ports are so located that the head of the piston uncovers the ports through about the final thirty-five degrees of power stroke crank travel, although this may be varied to suit requirements.

The pistons are connected to the crank shaft through connecting rods 35 of the usual type of construction.

Secured and sealed to the respective cylinder blocks 10 and 11 are heads 36 and 37, which are similarly formed and are provided with the usual water jackets 38; these heads forming the top or heads of the cylinders.

A fuel pump and distributor 39 is mounted between the two cylinder heads and supported thereon as indicated at 40, and supplies fuel to the charge of compressed air in the cylinders when the compression is practically complete, or adjacent the top of the stroke of the pistons.

Standard injection nozzles 41 are used, these nozzles communicating with fuel lines 42 and being mounted in the bases 43 which are secured and sealed on the heads, the nozzles projecting into the ports 44 which open through the heads to the cylinders.

The scavenging and auxiliary, or running-pressure system consists of a rotary positive compressor or pump for each pair of cylinders, associated integrally therewith each of which has air capacity equal to, or greater than the displacement of two cylinders under a minimum of ten pounds pressure and consists of a housing 45 which is water jacketed as indicated at 46 or otherwise cooled, and provided with an end plate or head 47, an intake port 48 communicating with the air cleaner 49 which is mounted on top of the cylinder head as shown.

The rotor or drum consists of a housing having end walls 50 and 51, quadrant peripheral walls 52, transverse vane-cooperating walls 53, hubs 54 being maintained when the vane-receiving slots 55 are finished, the shafts 56 and 57 being integral with the hubs and being mounted in ball bearings 58 which are respectively mounted in the cylinder block and the end plate or cover 47.

The vanes are mounted in the slots 55 and consist each of two opposed blade members 59—60 and 61—62, each pair of which is equal in total length to the vertical diameter of the bore 63 of the housing, the diameter of the bore at the transverse eccentric center of the rotor being equal to the vertical diameter and this diameter being maintained in the bore at all points crossing the eccentric center 64, whereby the bore is not truly circular. This arrangement permits the use of through vanes. A slight clearance may be left between the opposed blade members to compensate for slight inaccuracies in the bore and springs 65 provided to constantly urge the vanes to cooperate with the walls of the bore.

A rotatable shoe 66 is provided for each blade member and one pair of blades is slotted as indicated to form yoke members to straddle the tongues 68 formed on the other pair, to permit contact of the heels of the respective pairs of members.

The exhaust or discharge port 69 communicates with the compressed air chamber 70 formed in the head, and in which the running supply of air under pressure is maintained, ports communicating between this chamber and the respective cylinders, and the air chambers in the respective heads being in intercommunication through the manifold 71, these air chambers and manifold forming a storage reservoir for the scavenging and auxiliary charging air to insure a plentiful supply and to provide uniform pressure at all times to all of the cylinders, whether operating as power units or as compressors.

The pumps and the fuel injector are driven respectively through gears 72 and 73, all of which mesh with an idler gear 74 which is driven by a gear 75 which is driven through a shaft 76 mounted in the bearing 77, the shaft 76 having a spiral gear 78 mounted thereon which in turn is driven by the spiral gear 79, the gear 79 being in the form of a ring gear secured to the flange 29, thus permitting passage of the gear over the cranks for assembly.

A gear guard 80 is provided for the assemblage of gears 72 to 75, gears 72, 74 and 75 being respectively mounted on the shafts 81, 82 and 76, shafts 81 and 82 being supported in bearings 83 and 84 which are integral with a bracket 85 which is supported on lugs 86 and by flanges 87 projecting inwardly between the cylinder blocks, spacing blocks 88 cooperating between the cylinders and forming a cover for the housing for gear 78. Gears 73 are mounted on the shafts 56.

Thus, rotation of the crankshaft drives the compressors through gears 73, and the fuel injector and pump through gear 72 at substantially the speed of the crankshaft.

The air admission valve 89 has its stem reciprocable in a bearing 90 and is urged to substantially closed position, though not entirely closed, by a spring 91, the valve being normally unseated or cracked as indicated at 92, since the only purpose of the spring 91 is to maintain the valve in adjacent relation to its seat, the complete closing of the valve being accomplished by pressure in the cylinder in excess of that existing in the air chamber, while permitting unresisted entry of air when the pressure in the cylinder is below that of the air in the chamber, and permitting full opening for passage of air so long as the pressure in the air chamber is greater than that existing in the cylinder.

The stem of the valve is locked in the piston 93 which is reciprocable in the cylinder 94 and which is provided with a head 95, air traps being located both above and below the valve piston as indicated at 96 and 97, a bypass 98 controlled by a valve 99 communicating with the traps and being controlled by the piston, the passage being sealed by the piston as soon as the air escapes to the other trap.

Figure 2:
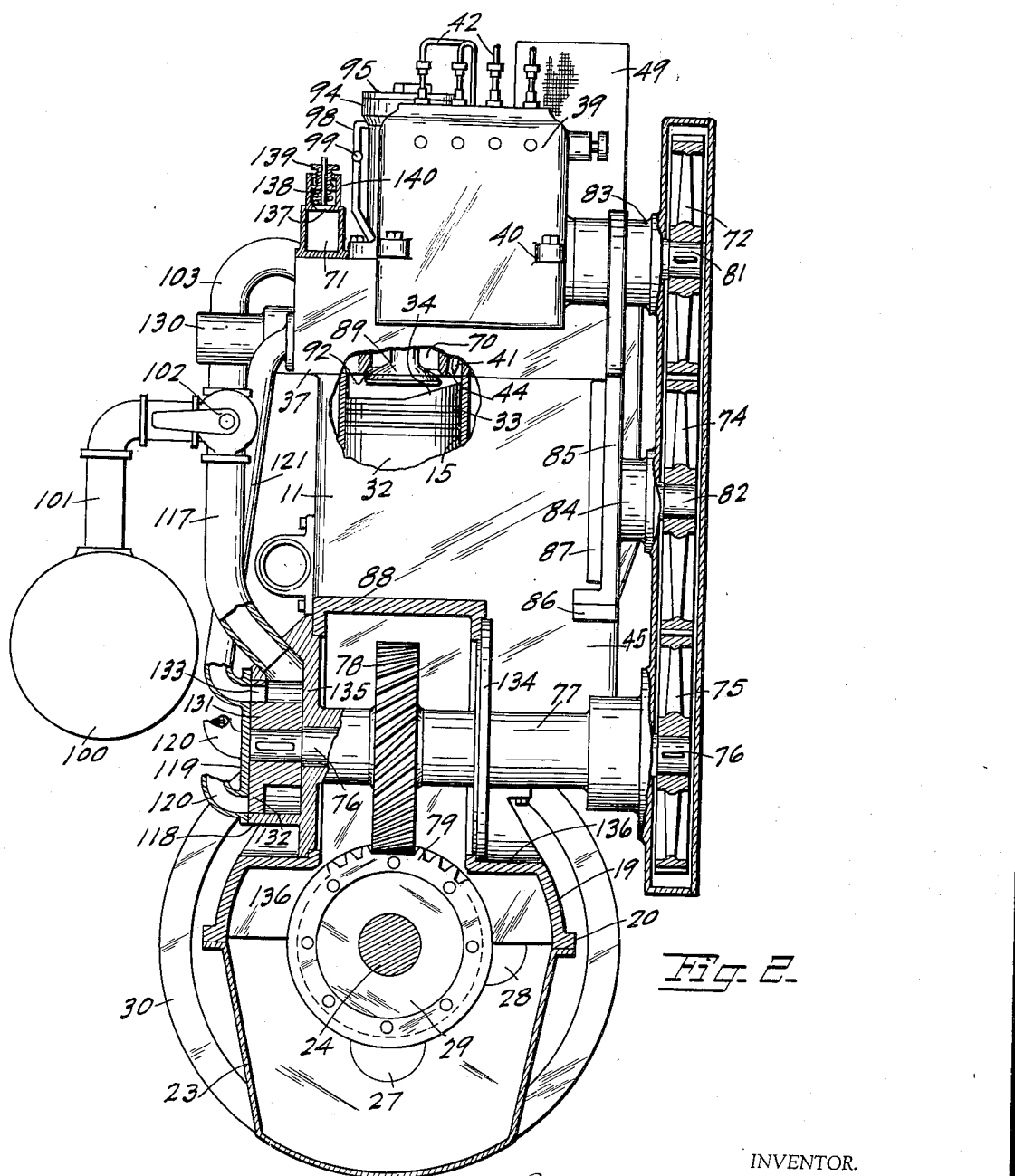
Fig. 2 is another sectional elevation taken substantially on the transverse center of the engine between the second and third cylinders corresponding to a line 2—2 of Fig. 3.
Figure 3:
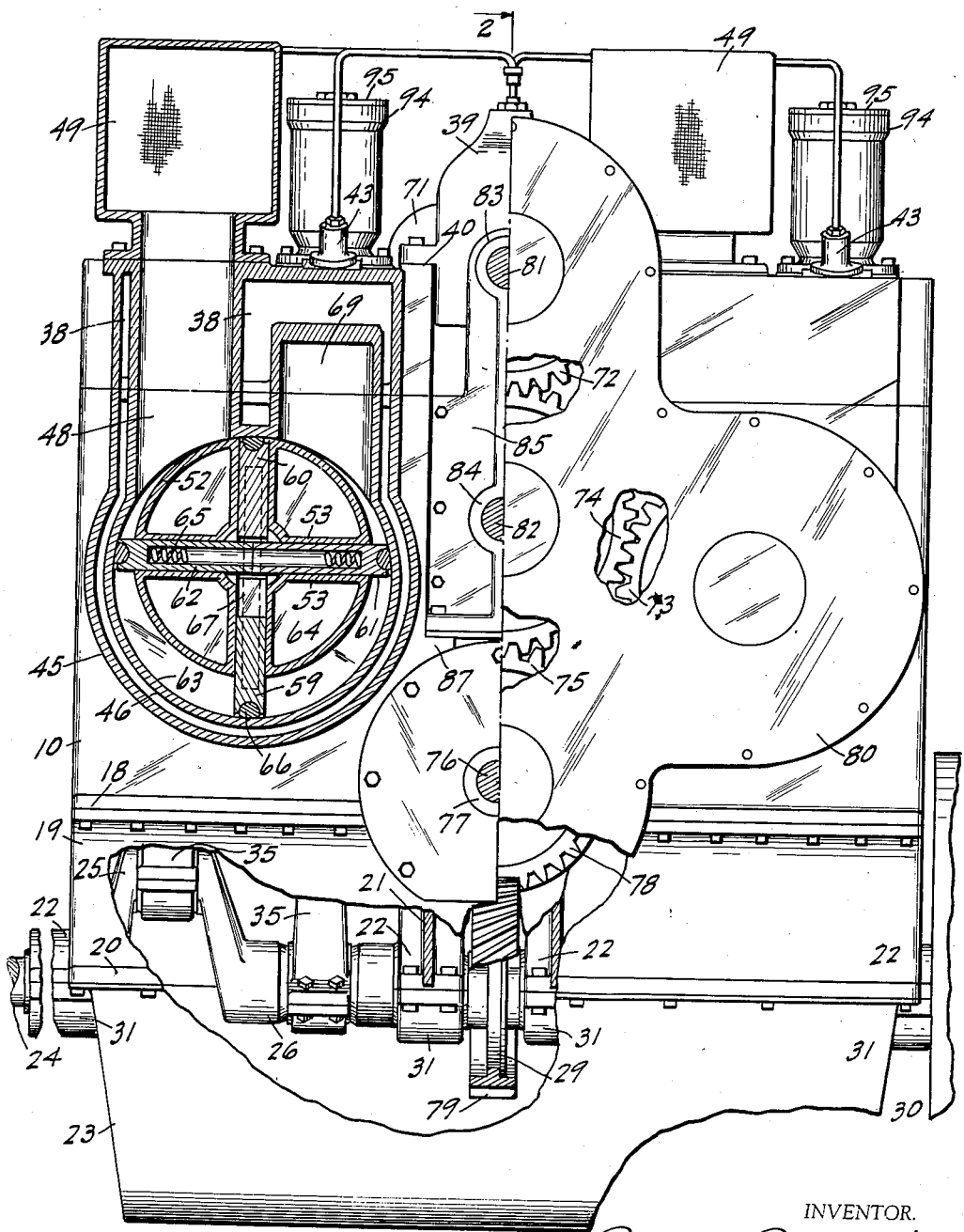
Fig. 3 is a side elevation shown half in section taken on line 3—3 of Fig. 1, and with portions broken out to show additional structural features.

The operation of this valve is as follows: With the engine dead, valve 89 is unseated or cracked as shown at 92, Fig. 2, and air is trapped in trap 96. When air under pressure in excess of that in the cylinder is contained in the air chamber 70, the valve is urged to open against the action of spring 91, being somewhat restricted against opening by the pressure differential existing between the traps 96 and 97 until the head of the valve piston uncovers the bypass opening to the trap 97. The valve then instantly snaps to its open position, the rapidity of opening being dependent upon the controlling action of the bypass valve 99, the valve 89 remaining fully open until the pressure in the cylinder and air chamber are equalized, and snaps shut instantaneously by the same action when the pressure in the cylinder exceeds that in the air chamber. The valve remains closed and is held closed by the pressure in the piston through the balance of the compression stroke and through the power stroke until the head of the piston uncovers the exhaust ports, at which time it again instantly opens, and remains open to continue the admission of air from the air chamber to build up the pressure in the cylinder during the compression stroke until the pressure of the air chamber is again reached. It is thus automatic in its action and assures a complete charge of air for the cylinder at each compression stroke.

The convertible compressor system consists of a pressure tank 100 communicating with a conduit 101 which is controlled by a valve 102 which controls the passage of air to and from the tank. The valve 102 communicates with a conduit 103 which in turn communicates with a discharge valve having a base 104 and an adjustable cap 105, the valve 106 being normally seated by the spring 107, the chamber 108 communicating with the conduit 103, and the valve 106 controlling the passage or discharge port 109 to the cylinder.

Slidable within the base 104 is a plunger 110 having a bore in which the valve stem is reciprocal, and a spiral groove 111 is formed in the upper section of the base for cooperation with a stud 112. The end 113 of the valve stem is spaced from the end of the bore in the plunger, and the end of the plunger just clears the inner surface of the cap 105.

Rotation of the cap 105 forces the plunger down to cooperate with the end 113 of the valve stem, firmly seating the valve against pressure within the cylinder when the cylinder is operated as an internal combustion motor, while when it is to be converted into a compressor, the cap is rotated in the opposite direction to release the valve to permit the discharge of air to the pressure tank.

The cap 105 is provided with a lever 114 which is eccentrically located, and which, through a connecting rod 115 and a valve 116 in the fuel line 42, shuts off the fuel supply to the cylinder in which the valve 106 is released for conversion to a compressor.

The conversion of one or more cylinders into compressors is accomplished by rotating the cap on each discharge valve of the cylinders which are to be converted, and which automatically closes off the fuel supply to such cylinders, the remaining cylinders operating as power units.

In the compressor units, air is admitted under pressure from the air chamber past the valves 89, into the cylinder until such time as, during the compression stroke, the pressure in the cylinder is in excess of that in the air chamber, at which time the valve 89 closes instantly, due to the air traps and their action on the valve, and the compression of the air is continued to the top of the stroke and discharged past the valve 106 into conduit 103, through valve 102, conduit 101 to the pressure tank 100.

The return stroke of the piston 32 is followed by a rush of air from the chamber 70, whereby the piston is not operating against any vacuum at any time and the cylinder is filled with air when it reaches the bottom of its stroke, thereby obtaining unusually high efficiency in compression.

During normal operation of the motor it is only necessary to convert one cylinder into a compressor for a brief period to build up the pressure in the tank 100 for starting purposes, and this can be instantly accomplished at will while the motor is running by merely rotating the cap 105 on one cylinder to a predetermined position, the valve 102 being normally left in communication between the discharge valve 106 and the tank 100. When the tank is fully replenished, the cap 105 is rotated to its other position which immediately converts the cylinder back to operation as an internal combustion motor, since the fuel supply is coincidently made accessible to the cylinder.

For heavy transportation installations such as for trucks or railway cars, all cylinders may be made convertible, and thus an unusually efficient and effective brake for the vehicle is provided, complete control being maintained by converting such cylinders as are necessary to obtain desired control of the vehicle, into compressors, while permitting the other cylinders to operate as engines.

The caps may be selectively or simultaneously adjusted from the interior of a vehicle (not shown) and the conversions made as required.

The starter system is instantaneous in operation since it performs, coincidently with propulsion of the motor, the charging of the cylinders with air, and includes the supply of air under pressure in the tank 100 which is delivered through a conduit 117 to the distributor 118 having a cap 119, which is provided with a plurality of outlets 120 connected through suitable conduits 121 to the ports 122, and thence to the valve ports 123, passage of the air from the port 123 to the port 109 being controlled by a valve 124.

The valve 124 seats in a valve seat formed in the extension 125 of the plug 126, this plug being threadedly secured in the cylinder head, the plug forming a guide for the valve stem 127, the end of which is secured in a block 128, the spring 129 cooperating between the block 128 and the plug 126 and being housed within the screw cap 130 and urging the valve 124 to its seat.

The distributor rotor 131 is secured on the shaft 76 and has a disk 132 provided with an arcuately elongated aperture 133 which successively registers with the respective outlets in overlapping relation, whereby air under pressure is admitted to each cylinder from top dead center through about 115 degrees of the power stroke after which the piston is followed by the expansion of the air only, until the exhaust port is uncovered by the piston while air is being delivered to a second piston in its power stroke for propulsion, the approximate arcuate length of the aperture or distributor being 115 degrees.

Coincidently with this admission of air, additional air under pressure is available in the air chamber 70 through the medium of the pumps driven through the gear train, and is admitted to the cylinder as soon as the pressure in the cylinder drops below that existing in the chamber.

The mounting means for the gear 78 and its shaft 76 and the distributor consists of the brackets 134 and 135 of substantially circular form which are bolted into openings formed in the sides of the upper crank case, the crank case being recessed at the sides as indicated at 136, the walls of the recesses clearing the gear 79.

The operation of the motor is as follows: Considering a supply of air under pressure in the tank 100 and a supply of fuel for the injector 39, and the engine dead, cap 105 turned to the position to fix the valve 106 on its seat and valve 116 open to permit passage of fuel to the injector nozzle, the engine is ready for starting.

Valve 102 is now turned to the position shown in Fig. 1 and air under pressure from tank 100 passes through conduit 117 to the distributor, thence through port 133 and conduits 121 to the respective cylinders which are on their power stroke through the ports 122, passage 123, past valve 124 into passage 109, to the cylinder forcing the pistons down on their power stroke, coincidently driving the pumps and building up pressure in the air chamber 70, the first piston down uncovering the exhaust port 17 and permitting only partial exhaustion of the air, whereby more of said compression is obtained on the compression stroke, while a second piston not subjected to this pressure is forced upwardly on its compression stroke while a charge of air from the air chamber is introduced past valve 89 to build up the pressure until the pressure in the cylinder and in the air chamber are equalized, valve 89 then closing instantly as previously described, the second piston continuing its compression of the air.

Adjacent the top of the stroke of the second piston, a charge of fuel is injected into the compressed charge of air through the nozzle 41 firing the admixture due to the high compression and the heat of compression on the principle of the "Diesel" type engine, starting the motor and placing it under its own power, the distributor feeding the cylinders until this firing is accomplished after which the valve 102 is turned to its other position, the valves 124 remaining closed.

After the engine has attained normal running speed, the air in tank 100 is replenished by simply turning one of the caps 105, as previously described, to convert such cylinder into a compressor, reconverting the cylinder as soon as the supply is brought back to its original pressure.

Stopping the motor merely requires shutting off the fuel supply, since the motor operates on the self-firing principle.

In this motor it is unnecessary to carry the compression to so high a stage as is necessary in the usual "Diesel" type engine, since the resistless or idle valve and supercharging, and complete scavenging produce a more thoroughly combustible gas which fires at a lower stage of compression, and the charging with air at a predetermined pressure until the pressure in the cylinder and air chamber is equalized permits a larger combustion space.

The pressure in the air chamber may be controlled and maintained uniform by means of a valve 137 communicating with the manifold 71 and urged by a spring 138 which is adjustable as to tension by means of a threaded, adjustable shoe 139 operating through a cap 140 of the valve housing, or by means of any adjustable release or safety valve, the required pressure depending upon the relative location of the ports 17 to crank travel at point of opening.

It will be noted that the pressure is always in one direction on the crankshaft, since pressure is always applied to the heads of the pistons, and that the admission valve is always open when there is insufficient pressure in the cylinders to keep it closed, and that the valve spring merely idles the valve in a position slightly spaced from its seat, and that the starter does not only propel the engine, but supplies it with air for combustion, and thus differs from compressed air starters previously used, and also that the engine does not depend upon the compression of an initial charge of air, but has its pressure built up from two distinct sources coincidently, that of compression and of a supply of compressed air.

It will be understood that variations in construction and arrangement of parts which are consistent with the appended claims may be resorted to without detracting from the spirit or scope of the invention or sacrificing any of the advantages thereof.

I claim:

1. In combination, a two-cycle internal combustion motor having a plurality of cylinders and pistons therefor, a fuel injector, a fuel nozzle for each cylinder, a supply of air under pressure and means operable at will for converting one or more of said cylinders into compressor units for creating said supply and including means for coincidently shutting off the fuel supply from said fuel injector to said cylinders converted into compressor units, and means controllable at will and operable at will through the medium of the air supply for starting the motor.

2. In combination, a two-cylinder, two-cycle, internal combustion motor, a fuel injector, a starting supply of air under pressure, means controllable at will during operation of said motor for coincidentally converting one cylinder of said motor into an air compressor for replenishing said starting supply and closing said fuel injector to said cylinder converted into a compressor to prevent contamination of the air of said starting supply with fuel.

3. In combination, a two-cylinder, two-cycle, internal combustion motor, a fuel injector, a starting supply of air under pressure, and means controllable at will during operation of said motor for converting one cylinder into an air compressor coincidently replenishing said starting supply, and closing said fuel injector to said cylinder to prevent contamination of the air of said starting supply.

4. In a two-cycle internal combustion motor having cylinders and piston-controlled exhaust ports, a starting charge of air under pressure, a fuel nozzle for each cylinder, means controlled at will for distributing said starting charge of air selectively to said cylinders, and means operable at will for selectively converting predetermined cylinders into compressors for replenishing said starting charge and a fuel nozzle valve coincidently adjustable with the means for closing off the fuel from the nozzle.

5. An internal combustion motor in combination, a crankshaft, two cylinders, a piston for each cylinder and a connecting rod for each piston, a discharge port in each cylinder controlled by the piston, an air chamber having an admission port for each cylinder and a normally unseated admission valve resiliently retained adjacent to its seat in each admission port, a fuel injector having a nozzle for each cylinder, means associated with the motor for maintaining a supply of air under constant pressure in said chamber, a discharge port in one cylinder and a pressure tank in communication therewith and a supply of air under pressure in the tank, a control valve for said one cylinder normally secured on its seat against pressure within the cylinder and located in said discharge port, and means for releasing said control valve at will, a starting inlet port and a spring urged valve therefor, a valve controlled distributor associated with said motor and communicating between said tank and said starting inlet port for admission of air for starting propulsion and coincidently forming after admission a charge of air for admixture with fuel from the fuel nozzle for spontaneous combustion upon compression by the piston, said admission valve being seated by pressure in the cylinder in excess of that existing in the chamber, said control valve coincidently controlling the fuel nozzle to its cylinder whereby said cylinder is converted into a compressor at will by release of said control valve, said cylinders receiving their supply of air from the air chamber for normal operation.

6. In combination, a two-cycle internal combustion motor having a plurality of cylinders and pistons therefor, a fuel injector, a fuel nozzle for each cylinder, a supply of air under pressure and means operable at will for converting one or more of said cylinders into compressor units for creating said air supply and including means for coincidently shutting off fuel supply from said fuel injector to the nozzles of said cylinders converted into compressor units, means controllable and operable at will through the medium of the said air supply for starting the motor.

7. In combination, a two-cylinder, two-cycle, internal combustion motor, a fuel injector for each cylinder, a starting supply of air under pressure, means controllable at will during operation of said motor for converting one cylinder into an air compressor for replenishing said starting supply and for coincidently closing said fuel injector to said cylinder converted into a compressor to prevent contamination of the air of said starting supply.

8. In combination, a two-cylinder, two-cycle, internal combustion motor, a fuel injector, a starting supply of air under pressure, means controllable at will for converting one cylinder into an air compressor for replenishing said starting supply and for coincidently closing said fuel injector to said one cylinder, and sealing the cylinder against passage of air to or from the supply during the remainder of the compression stroke to increase the output of the compressor.

9. In a two-cycle internal combustion motor having cylinders and pistons, a starting charge of air under pressure, a fuel nozzle for each cylinder, means controlled at will for distributing said starting charge to said cylinders, and means operable at will for selectively converting predetermined cylinders into compressors and a valve on the fuel nozzle of each of said predetermined cylinders coincidently adjustable for closing off the supply of fuel from the nozzle.

10. An internal combustion motor comprising two cylinders having a common air chamber formed in the head thereof; a converting valve for one cylinder and a fuel nozzle for each cylinder, means operable at will for coincidently adjusting said converting valve and closing the fuel nozzle of said one cylinder converting said one cylinder into a compressor unit.

11. A two cycle internal combustion motor comprising a crankshaft, two cylinders, a piston, having a connecting rod pivotally attached thereto, in slidable relation within each of said cylinders, a discharge port in each cylinder controlled by said piston, an admission valve resiliently retained adjacent to a seat in each admission port, a fuel injector having a nozzle for each cylinder, a discharge port in one of said cylinders having a pressure tank in communication therewith adapted to hold compressed air, a control valve for said cylinders disposed in said discharge port and normally secured on its seat against pressure within said cylinder, means for releasing said control valve, a starting inlet port having a spring-actuated valve, a distributor forming a passage from said pressure tank to said starting inlet port, said valve being actuated by pressure difference between said cylinder and said pressure tank, and means associated with said control valve for controlling said fuel nozzle for conversion to compressor operation.

12. A convertible engine substantially as described having means for forcing air under pressure into a suitable pressure tank, means for utilizing said stored air to operate said engine at starting, means for supplying air for combustion during each cycle of operation from said pressure tank, and means for continually replenishing air in said tank.

JOHN PHILLIPS.